(12) United States Patent
Lindoff et al.

(10) Patent No.: US 11,102,784 B2
(45) Date of Patent: Aug. 24, 2021

(54) METHOD AND NETWORK NODE FOR ENABLING MEASUREMENTS ON REFERENCE SIGNALS

(71) Applicant: Telefonaktiebolaget LM Ericsson (publ), Stockholm (SE)

(72) Inventors: Bengt Lindoff, Bjärred (SE); Magnus Åström, Lund (SE); Bo Hagerman, Jersey City, NJ (US); Fredrik Nordström, Lund (SE)

(73) Assignee: Telefonaktiebolaget LM Ericsson (Publ)

( * ) Notice: Subject to any disclaimer, the term of this patent is extended or adjusted under 35 U.S.C. 154(b) by 79 days.

(21) Appl. No.: 16/344,624

(22) PCT Filed: Oct. 24, 2016

(86) PCT No.: PCT/SE2016/051032
§ 371 (c)(1),
(2) Date: Apr. 24, 2019

(87) PCT Pub. No.: WO2018/080355
PCT Pub. Date: May 3, 2018

(65) Prior Publication Data
US 2020/0068572 A1 Feb. 27, 2020

(51) Int. Cl.
*H04W 4/00* (2018.01)
*H04W 72/04* (2009.01)
(Continued)

(52) U.S. Cl.
CPC ....... *H04W 72/0473* (2013.01); *H04L 5/0007* (2013.01); *H04W 52/346* (2013.01); *H04W 72/0453* (2013.01)

(58) Field of Classification Search
CPC .......... H04W 72/0473; H04W 52/346; H04W 72/0453; H04W 52/243; H04W 52/42;
(Continued)

(56) References Cited

U.S. PATENT DOCUMENTS

| 5,524,275 A * | 6/1996 | Lindell | ................ H03G 3/3042 |
| | | | 455/117 |
| 8,654,815 B1 * | 2/2014 | Forenza | ............... H04B 7/0626 |
| | | | 375/141 |
| 9,130,696 B2 * | 9/2015 | Catreux-Erceg | ..... H04B 7/0615 |

(Continued)

OTHER PUBLICATIONS

International Search Report and Written Opinion dated Jul. 10, 2017 for International Application No. PCT/SE2016/051032 filed on Oct. 24, 2016, consisting of 9-pages.

*Primary Examiner* — Stephen M D Agosta
(74) *Attorney, Agent, or Firm* — Christopher & Weisberg, P.A.

(57) ABSTRACT

A method and network node for enabling mobility measurements performed by wireless devices. A set of resource blocks are distributed across an available frequency bandwidth, and a pre-defined maximum average transmit power per resource block is available for transmission by the network node. The network node transmits (5:3A) a subset of resource blocks using a first transmit power per resource block which is higher than the pre-defined maximum average transmit power per resource block. The network node also transmits (5:3B) other resource blocks in the set not included in the subset using a second transmit power per resource block which is lower than the pre-defined maximum average transmit power per resource block so that the total transmit power used for transmitting the set of resource blocks does not exceed a total available maximum transmit power.

20 Claims, 6 Drawing Sheets

(51) Int. Cl.
*H04L 5/00* (2006.01)
*H04W 52/34* (2009.01)

(58) Field of Classification Search
CPC ... H04W 24/02; H04W 28/18; H04W 72/082; H04W 52/00; H04W 52/367; H04W 72/0413; H04L 5/007; H04L 5/0007; H04L 5/0037; H04L 5/005; H04L 1/0026; H04L 5/0044; H04L 5/0064; G06N 3/0436; G06N 5/048; H04B 17/309; H04B 17/318; H04B 17/345; H04B 17/382; H04B 1/525; H04B 7/04
See application file for complete search history.

(56) References Cited

U.S. PATENT DOCUMENTS

| | | | |
|---|---|---|---|
| 9,301,184 B2 * | 3/2016 | Bontu | H04W 36/0061 |
| 9,480,054 B1 * | 10/2016 | Schein | H04W 52/343 |
| 10,091,695 B2 * | 10/2018 | Shin | H04L 5/0048 |
| 10,470,064 B2 * | 11/2019 | Davydov | H04B 7/0632 |
| 2008/0043813 A1 * | 2/2008 | Azenkot | H04B 1/71632 |
| | | | 375/133 |
| 2009/0298522 A1 * | 12/2009 | Chaudhri | H04W 16/14 |
| | | | 455/509 |
| 2010/0159854 A1 * | 6/2010 | Kim | H04B 7/04 |
| | | | 455/101 |
| 2010/0317385 A1 * | 12/2010 | Kazmi | H04W 52/243 |
| | | | 455/501 |
| 2011/0081933 A1 * | 4/2011 | Suh | G01S 5/0236 |
| | | | 455/509 |
| 2011/0275397 A1 * | 11/2011 | Guey | H04W 16/12 |
| | | | 455/509 |
| 2012/0082022 A1 * | 4/2012 | Damnjanovic | H04W 24/10 |
| | | | 370/201 |
| 2013/0010631 A1 * | 1/2013 | Jung | H04W 16/18 |
| | | | 370/252 |
| 2013/0153298 A1 * | 6/2013 | Pietraski | H04W 36/00837 |
| | | | 175/45 |
| 2013/0303153 A1 * | 11/2013 | Bontu | H04W 24/02 |
| | | | 455/423 |
| 2013/0344816 A1 * | 12/2013 | Niu | H04B 17/318 |
| | | | 455/67.13 |
| 2014/0057664 A1 * | 2/2014 | Pei | G01S 5/0215 |
| | | | 455/456.5 |
| 2015/0016387 A1 * | 1/2015 | Elmdahl | H04L 5/0032 |
| | | | 370/329 |
| 2015/0181570 A1 | 6/2015 | Sorrentino et al. | |
| 2016/0291128 A1 | 10/2016 | Persson et al. | |
| 2018/0152966 A1 * | 5/2018 | Goldhamer | H04W 72/087 |

* cited by examiner

METHOD AND NETWORK NODE FOR ENABLING MEASUREMENTS ON REFERENCE SIGNALS

CROSS-REFERENCE TO RELATED APPLICATIONS

This application is a Submission Under 35 U.S.C. § 371 for U.S. National Stage Patent Application of International Application Number: PCT/SE2016/051032, filed Oct. 24, 2016 entitled "METHOD AND NETWORK NODE FOR ENABLING MEASUREMENTS ON REFERENCE SIGNALS," the entirety of which is incorporated herein by reference.

TECHNICAL FIELD

The present disclosure relates generally to a method and a network node of a wireless network, for enabling measurements on reference signals performed by wireless devices.

BACKGROUND

In a wireless network comprising a plurality of network nodes, it is desirable to utilize available radio resources as efficiently as possible so as to achieve high capacity and adequate performance in communication with wireless devices. The term "wireless network" is used in this description to denote any network comprising network nodes, such as base stations, access points, eNodeBs or the like, which are capable of radio communication with wireless devices, e.g. by transmitting resource blocks or the like. The resource blocks are used for carrying various data and control information and also reference signals which can be used for various measurements. The term "resource block" is used herein as a generic term to represent a set of resource elements in which reference signals, user data and/or control data can be transmitted from a network node, regardless of how the resource elements are organized or arranged in the resource block.

The nodes in the wireless network that perform such radio communication with wireless devices are also generally denoted "network nodes" herein. Further, the term "wireless device" denotes any communication equipment that is capable of radio communication with network nodes in a wireless network. Some non-limiting examples of wireless devices that may be involved in the procedures described herein include mobile phones, smartphones, tablets, laptop computers and Machine-to-Machine, M2M, devices. Throughout this description, the term "User Equipment", UE, may be used instead of wireless device. Further, the term "user" is sometimes used herein to represent a wireless device.

In order to support coherent downlink reception as well as to evaluate whether a connection to a network node is suitable for communication and to configure various parameters for the communication, the wireless devices are requested to perform measurements on predefined reference signals which are regularly transmitted from the network node. In a wireless network operating according to Long Term Evolution, LTE, as defined by the third Generation Partnership Project, 3GPP, signals are transmitted by the network nodes using Orthogonal Frequency-Division Multiplexing, OFDM, which is a method of encoding digital data on multiple carrier frequencies.

In this description the reference signals will sometimes be referred to as "Cell-specific Reference Signals", CRSs, which term is commonly used in LTE, although this description is not limited to using CRSs as reference signals. For downlink transmission, various information and signals can be organized in a resource block, as also mentioned above. Further, resource elements in LTE are typically organized in a so-called "resource block pair" of 1 ms duration where a single resource block is defined with a duration of 0.5 ms. A resource block as described herein may be such a resource block pair as defined in LTE, although this description is not limited to the LTE definition of a resource block.

An example of how a resource block may be configured is illustrated in FIG. 1. A downlink transmission may comprise multiple parallel resource blocks which can be arranged in the frequency domain as distributed in a "stacked" manner across an available frequency bandwidth. In other words, the total available frequency bandwidth can be divided into a set of resource blocks which are thus separated in the frequency domain. One resource block 100, or resource block pair if using the LTE terminology, may extend over 180 kHz during 1 millisecond, ms. The resource block 100 can be further divided into 12 subcarriers in the frequency domain and into 14 OFDM symbols in the time domain, as shown in FIG. 1. The resource block 100 in FIG. 1 is thus effectively a "resource grid" divided into 12 elements in the frequency domain representing the subcarriers and 14 elements in the time domain representing the OFDM symbols.

In this example, the smallest resource in the resource block 100 is comprised of one Resource Element, RE, 100A which corresponds to the spectrum allocated for one sub-carrier 1008 during one OFDM symbol 100C. The resource block 100 in this example is thus comprised of 12×14 REs. The first 1 to 3 OFDM symbols may compose the control region where mainly the Physical Downlink Control Channel, PDCCH, can be multiplexed. The rest of the OFDM symbols in the resource block 100 may compose the data region where mainly the Physical Downlink Shared Channel, PDSCH, can be multiplexed.

Some predefined resource elements in preset positions in this time/frequency grid can be used for transmitting CRSs which are indicated in FIG. 1 as striped resource elements, while the resource elements used for user data and control data are shown to be non-striped. A predetermined sequence of CRSs thus occur in predefined RE positions which are known to the wireless devices. The CRSs can be used by the wireless devices for synchronization, channel estimation, determination of a Channel Quality Indicator, CQI, a Rank Indicator, RI and a Precoding Matrix Indicator, PMI, as well as for mobility measurements such as measuring Reference Signal Received Power, RSRP, and Reference Signal Received Quality, RSRQ, etc.

Since reference signals such as CRSs are used for cell or mobility measurements by wireless devices in idle mode which are more or less unknown to the network, the reference signals for mobility measurements effectively determine the coverage of a cell served by the network node. In other words, the cell extends as far as the reference signals can be detected and used. Throughout this description, reference signals intended for mobility measurements are referred to as "mobility reference signals".

However, it is a problem that a certain limited amount of transmit power is typically available in the network node which may not be sufficient to provide the coverage wanted for the cell. FIG. 2 illustrates that a set of resource blocks, RBs, 200 are distributed across a total frequency bandwidth 202 used for downlink transmission. The total maximum transmit power available in the network node may be determined by existing equipment such as a power amplifier having a certain capacity. When a network node is upgraded by increasing the number of transmit antennas, e.g. to provide higher user data throughput, the transmit power that can be used for each antenna will be reduced given the available total maximum transmit power since the transmit power must be shared by more antennas.

It may be possible to extend the coverage of the cell, or maintain it when the number of transmit antennas is increased for the network node, by installing a new power amplifier with higher capacity and/or by reconfiguring or "retuning" certain mobility parameters, sometimes referred to as Radio Resource Management, RRM, parameters. However, such solutions are quite expensive to employ for each network node, especially when a great number of network nodes need to be upgraded and/or reconfigured in the wireless network, e.g. when the number of transmit antennas is increased.

SUMMARY

It is an object of embodiments described herein to address at least some of the problems and issues outlined above. It is possible to achieve this object and others by using a method and a network node as defined in the attached independent claims.

According to one aspect, a method is performed by a network node of a wireless network, for enabling mobility measurements performed by wireless devices, wherein a set of resource blocks are distributed in frequency domain across an available frequency bandwidth, and wherein a pre-defined maximum average transmit power per resource block is available for transmission by the network node. In this method, the network node obtains an allocation of a subset of resource blocks in the set of resource blocks, to be used for mobility reference signals intended for mobility measurements.

The network node then transmits the subset of resource blocks using a first transmit power per resource block which is higher than the pre-defined maximum average transmit power per resource block. The network node also transmits other resource blocks in the set not included in the subset using a second transmit power per resource block which is lower than the pre-defined maximum average transmit power per resource block so that the total transmit power used for transmitting the set of resource blocks does not exceed a total available maximum transmit power.

According to another aspect, a network node is arranged to enable mobility measurements performed by wireless devices, wherein a set of resource blocks are distributed in frequency domain across an available frequency bandwidth, and wherein a pre-defined maximum average transmit power per resource block is available for transmission by the network node. The network node is configured to obtain an allocation of a subset of resource blocks in the set of resource blocks, to be used for mobility reference signals intended for mobility measurements.

The network node is further configured to transmit the subset of resource blocks using a first transmit power per resource block which is higher than the pre-defined maximum average transmit power per resource block. The network node is further configured to transmit other resource blocks in the set not included in the subset using a second transmit power per resource block which is lower than the pre-defined maximum average transmit power per resource block so that the total transmit power used for transmitting the set of resource blocks does not exceed a total available maximum transmit power.

An advantage that may be achieved by the above method and network node is that the network node is able to extend its coverage area by increasing the mobility coverage without requiring increased power amplifier capacity. Another advantage is that it may be avoided that the network node's cell or mobility coverage is reduced when the number of transmit antennas configured for the network node is increased, so that the mobility coverage may be more or less maintained or even improved.

The above method and network node may be configured and implemented according to different optional embodiments to accomplish further features and benefits, to be described below.

A computer program is also provided which comprises instructions which, when executed on at least one processor, cause the at least one processor to carry out the method described above. A carrier containing the above computer program is further provided, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable extended or in some cases maintained coverage of a cell when only a certain limited total amount of transmit power is available, e.g. as determined by an existing power amplifier in the network node. It was mentioned above that the cell coverage is dependent on how far the reference signals for mobility measurements can be detected and used by wireless devices, and that the available transmit power is sometimes not sufficient to achieve a wanted coverage.

Figure 1:
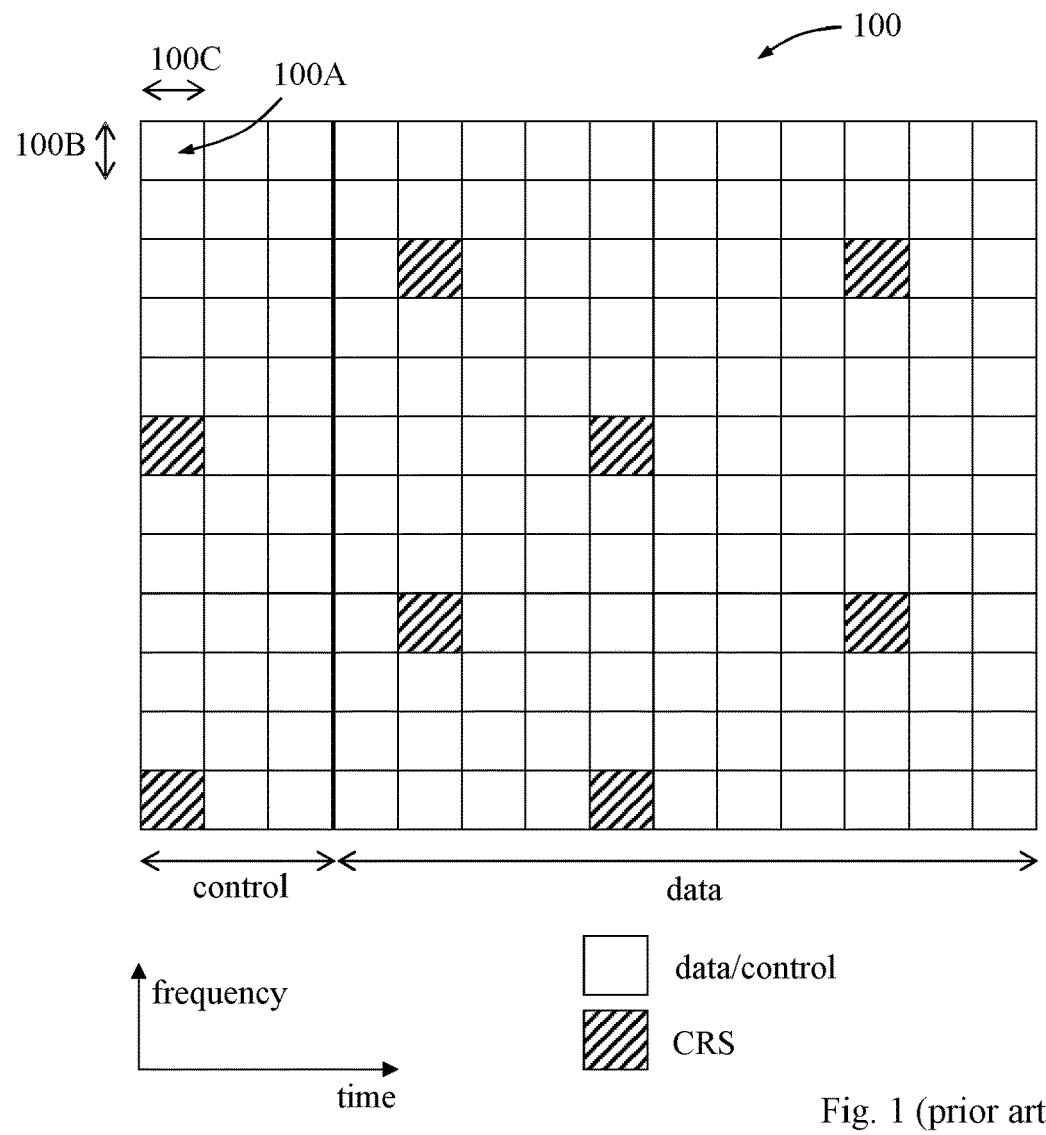
FIG. 1 illustrates an example downlink resource block or resource block pair with resource elements used for reference signals in predefined positions, according to the prior art.
Figure 2:
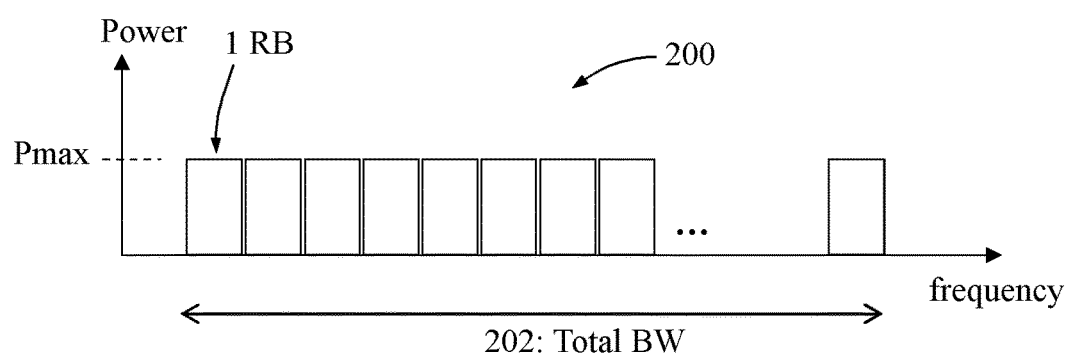
FIG. 2 illustrates an example of how an available frequency bandwidth can be divided into a set of resource blocks, according to the prior art.

In this solution it has been recognized that the above limitation of coverage occurs when all resource blocks, or resource block pairs in LTE terminology, are transmitted with the same transmit power so that the total used transmit power does not exceed the available transmit power. In FIG. 2, all resource blocks are transmitted using the same transmit power that is limited to a certain pre-defined maximum average transmit power, Pavg, per resource block. As a result, the network node's cell or mobility coverage will be reduced when increasing the number of transmit antennas configured for the network node.

This can be overcome by re-distributing the transmit power across the total set of available resource blocks, including increasing the transmit power for a subset of resource blocks to be used for the mobility reference signals while reducing the transmit power for the remaining resource blocks in the total set of available resource blocks, such that the total transmit power used does not exceed the total available maximum transmit power. Thereby, the mobility reference signals will reach farther away from the network node, hence their transmission range is effectively extended, as compared to using the same transmit power for all resource blocks as in FIG. 2.

It was further mentioned above that the cell coverage may be reduced when increasing the number of transmit antennas while using e.g. an existing power amplifier of a certain limited capacity. This may also be the case even when the total output power is increased. It will now be described in more detail, with reference to FIGS. 3A-C, how the coverage of a cell is affected when the network node is upgraded by increasing the number of antennas or antenna ports therein, using LTE as an illustrative but non-limiting example. In this description, the terms antenna and antenna port are used interchangeably and the term antenna is frequently used for short.

A majority of the currently installed LTE network nodes uses two transmit antennas, or TX antennas for short, even though the LTE 3GPP release 8 specifies that the network nodes support 4 TX antennas. However, early wireless devices configured for LTE only support 2 receive antennas, or RX antennas for short, and hence those devices do not support communication with high throughput such as when 4 MIMO layers are used for high data rates. Therefore, it has not been necessary for network operators to invest in network nodes that support more than 2 TX antennas, which means that a maximum of 2 MIMO layers could be provided. Furthermore, to achieve wide area coverage in macro cells, high transmit power can be used, typically 40 W or more per TX antenna.

With the success of mobile broadband and evolution of LTE technologies, wireless devices with 4 RX antennas are now employed to satisfy users requiring improved throughput and peak data rates. Hence, there is a commercial need for increased data rates and system capacity, and therefore the network operators need to upgrade their network nodes to support 4 TX antennas instead of previously only two. For reasons related to costs and performance requirements, the total transmit power available for data communication can be increased although it may at the same time be reduced per antenna, e.g. from 40 W to 30 W per antenna, for increased number of antennas, e.g. using modular support of Power Amplifiers. Combined with improved beamforming ability where signals are manipulated on different antennas or antenna ports to be constructively combined at the receiver, throughput in the 4 TX antenna configuration will significantly exceed the throughput achieved in the 2 TX antenna configuration.

Mobility in LTE utilizes that the wireless device measures the RSRP on CRSs transmitted by the network node on antenna port 0 and optionally antenna port 1.

CRS symbols are primarily used for channel estimation. This means that the CRS symbols are used for computing how different antennas should be combined in order to achieve the constructive combining, i.e., beamforming, at the receiver. Hence beamforming may not be used for CRS symbols. The LTE standard allows for using a subset of RBs, say 6 RBs, for mobility measurements, which may be signaled to the wireless device. Furthermore, network nodes in current wireless networks typically use higher transmit power per TX antenna for a configuration with few TX antennas compared to network nodes with many TX antennas due to improved ability for combining antenna outputs, e.g., by beamforming, and thereby achieving better signal conditions at the receiver.

With reference to the above example of upgrading network nodes from 2 TX antennas to 4 TX antennas, a network node may use a maximum of 40 W transmit power per antenna for the two TX antenna configuration, e.g. to serve a macro cell, while an upgraded "evolved" network node, i.e. having 4TX antennas, only supports max 30 W per antenna.

Even if the total power for the evolved network nodes is higher and hence data coverage for a given spot on average is higher, the currently installed network topology, including the geographical placement of network nodes, has been made based on the original TX power output of 40 W for CRSs. Hence, the coverage of the original 2 TX network node, e.g. with respect to the mobility reference signals denoted CRS 0 and CRS 1 which are typically transmitted from the antenna ports 0 and 1, respectively, to enable mobility measurements, is effectively larger than the coverage of the evolved 4 TX network node.

Figure 3A:
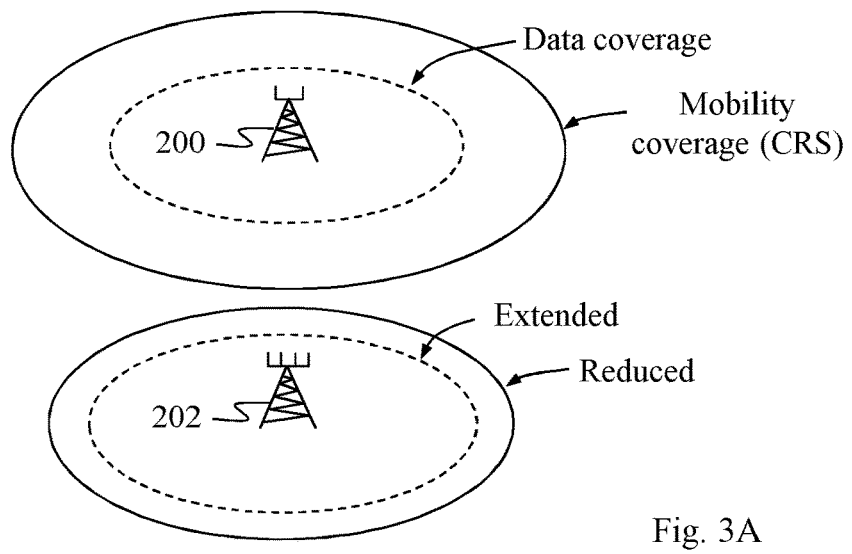
FIGS. 3A-C illustrate how coverage may change when upgrading network nodes by increasing the number of transmit antennas.
Figure 3B:
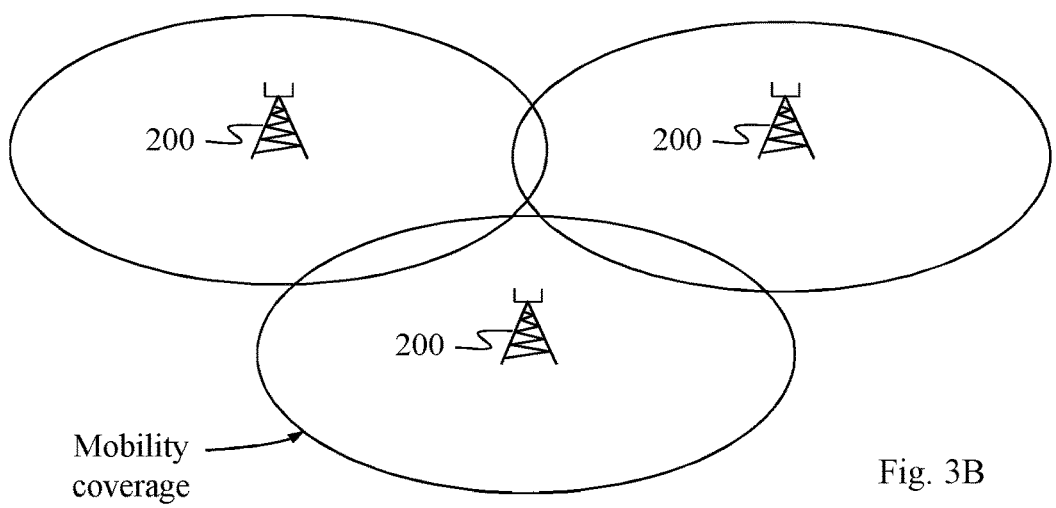
Figure 3C:
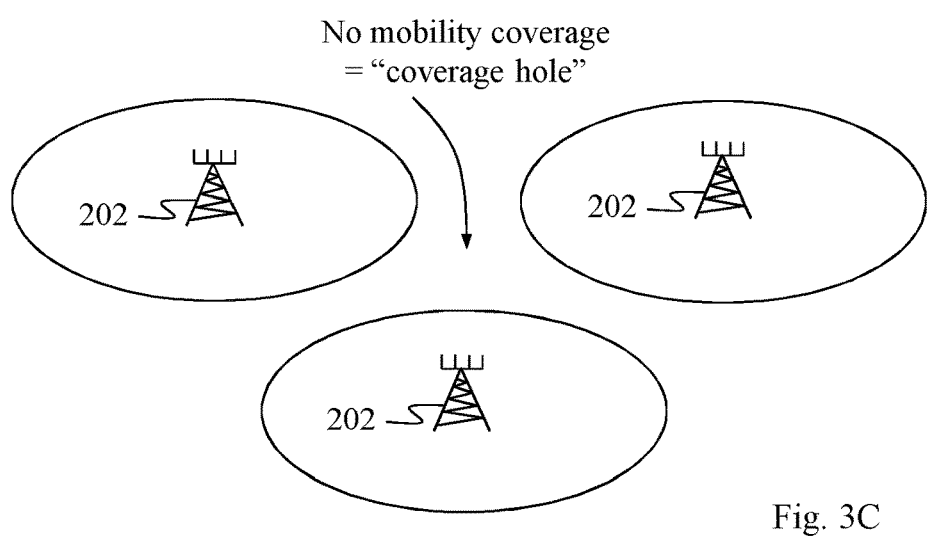

It can be said that a network node provides a certain mobility coverage which is determined by the transmission range of mobility reference signals, and also a certain data coverage which is determined by the transmission range of data signals. The mobility coverage is typically larger than the data coverage, as shown in FIG. 3A. FIG. 3A further illustrates that the data coverage can be increased when upgrading a network node 200 with 2 TX antennas to a network node 202 with 4 TX antennas while the mobility coverage, which may also be referred to as the CRS range, is reduced from node 200 to node 202 due to the reduced power per antenna as explained above. FIG. 3B illustrates the mobility coverage of three neighboring network nodes 200 with 2 TX antennas and FIG. 3C illustrates the mobility coverage of three neighboring network nodes 202 with 4 TX antennas. The network nodes 200 were placed geographically to provide a virtually complete mobility coverage using 2 TX antennas each. If these nodes are replaced, or upgraded, by the network nodes 202 with 4 TX antennas at the same geographical positions, there will be areas between the cells with no mobility coverage, i.e. forming "coverage holes", due to the reduced mobility coverage of each network node 202.

As mentioned above, this can be solved by a re-design, i.e. re-tuning, of mobility parameters, e.g. related to hysteresis, thresholds and so forth, on a per network node basis. This is especially the case in a migration scenario where network nodes are updated gradually in the wireless network. This retuning of mobility or RRM parameters on a per network node basis requires much time-consuming work resulting in huge costs for the network operator.

It was mentioned above that the problem of reduced mobility coverage when upgrading a network node with more transmit antennas may be overcome or at least reduced by increasing the transmit power for a subset of resource blocks used for mobility reference signals and reducing the transmit power for the remaining resource blocks in the total set of available resource blocks. This way, the mobility coverage can be extended as compared to using the same transmit power for all resource blocks, while still consuming a total transmit power that does not exceed the network node's total available maximum transmit power.

Figure 4:
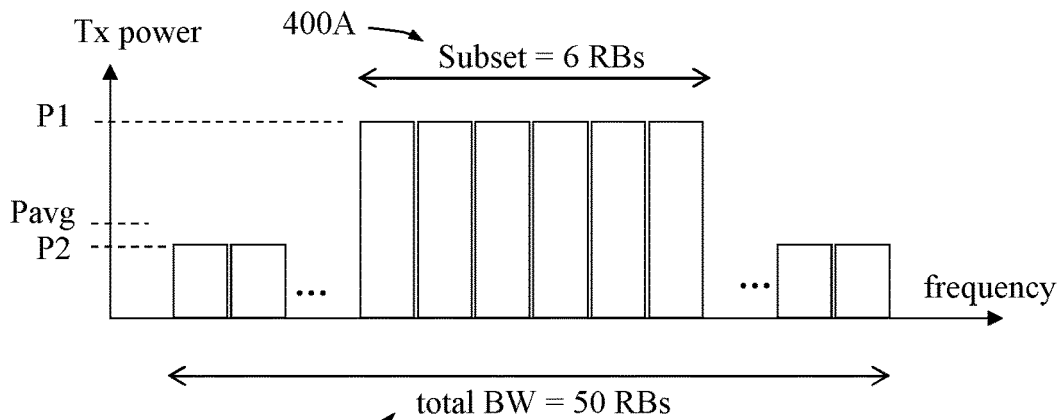
FIG. 4 illustrates an example of how the transmit power can be re-distributed across a set of resource blocks, according to some possible embodiments.

An example of how this may be done is illustrated schematically in FIG. 4 where 400 denotes a total set of resource blocks, in this example 50 RBs, which are distributed across an available frequency bandwidth "total BW", and a subset of resource blocks, in this example 6 RBs, is denoted 400A. The subset of 6 resource blocks 400A is thus a part of the entire set of 50 resource blocks 400. The subset of 6 resource blocks 400A may be located symmetrically in the middle of the available frequency bandwidth such that there is an equal number of other resource blocks both below and above the resource blocks 400A in frequency domain, although the solution is not limited to any particular location or distribution of the subset of 6 resource blocks 400A in the total set of resource blocks 400.

It is assumed that a pre-defined maximum average transmit power per resource block is available for transmission by the network node, corresponding to a situation when the same transmit power would be used for all resource blocks as shown in FIG. 2 where the maximum average transmit power per resource block is denoted "Pavg". This also means that a certain total maximum transmit power is available in the network node as determined by Pavg and the number of resource blocks, and the total available maximum transmit power may be limited by the capacity of an existing power amplifier in the network node.

The network node transmits the resource blocks 400 as follows. The subset of 6 resource blocks 400A is transmitted using a first transmit power P1 per resource block which is higher than the pre-defined maximum average transmit power Pavg per resource block. In addition, the network node transmits the other resource blocks in the set 400 not included in the subset 400A using a second transmit power P2 per resource block which is lower than the pre-defined maximum average transmit power Pavg per resource block, P1 thus being higher than P2. The first and second transmit powers P1 and P2 are determined so that the total transmit power used for transmitting the set of resource blocks 400 does not exceed a total available maximum transmit power. In other words, P1 and P2 are chosen so that the average transmit power used across all resource blocks in this scheme will not exceed Pavg. An example of how the first and second transmit powers P1 and P2 may be determined and applied is described below.

Figure 5:
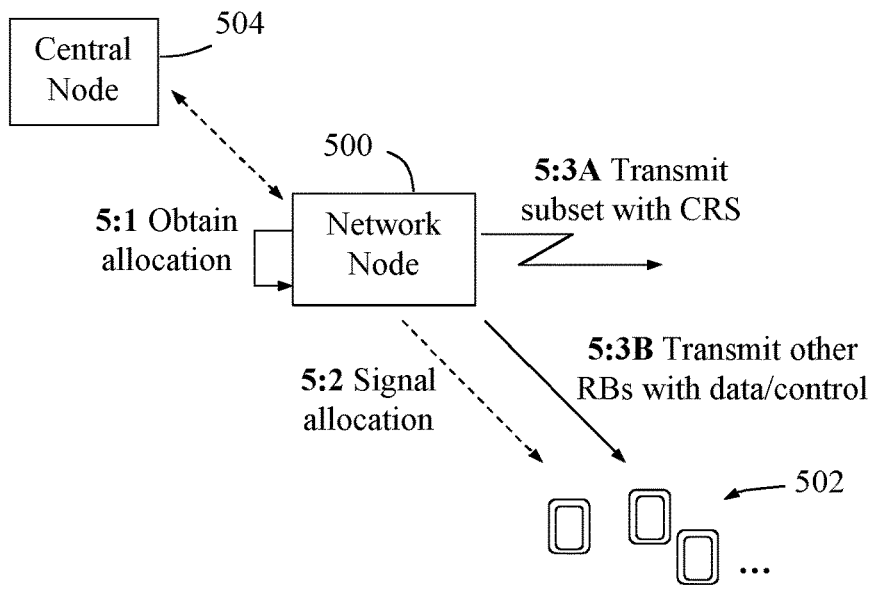
FIG. 5 is a communication scenario illustrating an example of how the solution may be employed, according to further possible embodiments.

A communication scenario where the solution may be employed is shown in FIG. 5 involving a network node 500 which provides mobility coverage for one or more wireless devices 502 in a wireless network. In this example, the network node 500 transmits resource blocks in accordance with FIG. 4 and as follows. A first action 5:1 illustrates that the network node 500 obtains an allocation of the subset of resource blocks 400A, which may be determined by the network node 500 itself or obtained from a central node 504 as indicated by a dashed two-way arrow. For example, the number of resource blocks in the subset 400A may be selected depending on what mobility coverage is desired in relation to the desired user data throughput performance for the cell, and on how much transmit power is available.

In an optional action 5:2, the network node 500 may signal the allocation of the subset of resource blocks 400A to the wireless devices 502 in dedicated messages or in a broadcast message. For example, the network node 500 may signal the allocation in the form of a predefined indication indicating that a subset of resource blocks should be used for mobility measurements, and also some information indicating what that subset is. This signalling may be embedded in measurement setup signalling or in other signalling, e.g. signalling regarding some other action to be taken at the receiver. Alternatively, the arrangement of the subset of resource blocks 400A may have been configured in the wireless devices 502 through some other mechanism, e.g. as transmitted or broadcasted from other network nodes that the wireless devices 502 have received signals from.

Another action 5:3A illustrates that the network node 500 transmits the subset of resource blocks 400A using the above-described first transmit power P1 per resource block. In a parallel or simultaneous action 5:3B, the network node 500 also transmits the other resource blocks in the set 400 not included in the subset 400A using the above-described lower second transmit power P2 per resource block. P1 is thus above Pavg and P2 is below Pavg as illustrated in FIG. 4.

An example will now be described, with reference to the flow chart in FIG. 6, of how the solution may be employed in terms of actions which may be performed by a network node such as the above-described network node 500. Some optional example embodiments that could be used in this procedure will also be described. Reference will also be made, without limiting the described features and embodiments, to the example scenario shown in FIG. 5 and to the example power distribution in FIG. 4, where applicable. The network node 500 in this procedure is serving a first cell in a wireless network, and it is arranged to enable mobility measurements performed by wireless devices. It is assumed that a set of resource blocks are distributed in frequency domain across an available frequency bandwidth, and that a pre-defined maximum average transmit power Pavg per resource block in the set is available for transmission by the network node 500.

A first action 600 illustrates that the network node 500 in this procedure obtains an allocation of a subset of resource blocks 400A in the set of resource blocks 400, to be used for mobility reference signals intended for mobility measurements, which corresponds to action 5:1 above. In one example embodiment, the network node 500 may signal the allocation of the subset 400A to the wireless devices 502, e.g. in dedicated messages or in a broadcast message, as shown in an optional action 602 which also corresponds to action 5:2 above.

In a further action 604, the network node 500 transmits the subset of resource blocks 400A using a first transmit power P1 per resource block which is higher than the pre-defined maximum average transmit power per resource block. At the same time, the network node 500 transmits other resource blocks in the set 400 not included in the subset 400A using a second transmit power P2 per resource block which is lower than the pre-defined maximum average transmit power per resource block, as shown in a parallel action 606. This action is performed so that the total transmit power used for transmitting the set of resource blocks does not exceed a total available maximum transmit power. In other words, the total transmit power required for transmitting the subset 400A with transmit power P1 and for transmitting the remaining resource blocks in the set 400 with transmit power P2 is below or equal to the total available maximum transmit power.

Thereby, it is an advantage that the network node 500 is able to either extend its coverage area by increasing the mobility coverage without requiring increased power amplifier capacity, or to avoid that the network node's cell or mobility coverage is reduced when the number of transmit antennas configured for the network node 500 is increased, thus more or less maintaining or even improving the mobility coverage.

Some further non-limiting example embodiments that can be used in the above procedure of FIG. 6, will now be described. In some example embodiments, the first transmit power P1 per resource block may correspond to a power increase Pb from a normalized power of 1 representing the pre-defined maximum average transmit power Pavg per resource block, and the second transmit power P2 per resource block may correspond to a power decrease Pd from the normalized power. The network node 500 may then set the power increase Pb of P1 to a wanted value and determine the power decrease Pd of P2 as:

$$Pd=1-N\_m*Pb/(N-N\_m) \qquad (1)$$

In this formula, N is the total number of resource blocks in the entire set of resource blocks 400 and $N\_m$ is the number of resource blocks in the allocated subset of resource blocks. In the example shown in FIG. 4, N is 50 and $N\_m$ is 6. Generally, if the number of resource blocks $N\_m$ in the allocated subset 400A is significantly lower than the number of remaining resource blocks $N-N\_m$ in the entire set 400, the power increase Pb of P1 will be significantly greater than the power decrease Pd of P2. FIG. 4 illustrates such a case where $N\_m$ is 6 while $N-N\_m$ is 44. As a result, it can be seen that the difference between P1 and Pavg can be made much greater than the difference between P2 and Pavg, so that the increase of transmission range for the mobility reference signals transmitted in subset 400A will be correspondingly greater than the reduction of transmission range for other signals, e.g. user data and control data, not transmitted in subset 400A.

In another example embodiment, the power increase Pb may be set or determined depending on the number of transmit antennas at, or configured for, the network node 500. For example, if the number of transmit antennas is increased from 2 to 4 at, or configured for, the network node 500, the power increase Pb may be set so that the mobility coverage is basically maintained, i.e. the same mobility coverage is obtained for 4 transmit antennas as was obtained for 2 transmit antennas. For example, the transmit antennas may be used for providing several Multiple-Input-Multiple-Output, MIMO, layers. In that case, if the number of transmit antennas is increased the number of MIMO layers can also be increased.

In another example embodiment, the power increase Pb may be set for one or two antennas via which the subset of resource blocks used for mobility reference signals are transmitted thus using power P1, while the other resource blocks in the set transmitted on the same one or two antennas are transmitted using power P2 according to the power decrease Pd. The remaining antennas of the network node 500, if any, may transmit with unchanged power Pavg across the entire set of resource blocks 400. In other words, the power redistribution according to P1 and P2 may be used on just a subset of the antennas, from which mobility reference signals in the subset 400A are transmitted while a homogeneous or uniform power distribution according to Pavg may be used on the remaining antennas for transmitting the entire set 400. This means that the redistribution of power could be restricted to only some antennas, i.e. the ones transmitting CRS symbols for mobility measurements, while the other antennas may transmit each resource block with the maximum average output power Pavg.

In another example embodiment, the first transmit power P1 per resource block may be applied to extend a coverage area of the network node 500 so as to increase mobility coverage in the wireless network, which was also described above.

In another example embodiment, the network node 500 may be upgraded by increasing the number of transmit antennas, and the first transmit power P1 per resource block may then be applied to maintain a coverage area of the network node 500 achieved before increasing the number of transmit antennas, which was likewise described above.

Yet another example embodiment may be that the first transmit power P1 per resource block is used only for transmitting the mobility reference signals in the allocated subset 400A and the second transmit power P2 per resource block is used for transmitting other signals in the allocated subset 400A. Thereby, the amount of extra power required for achieving increased mobility coverage by allocating and using the subset 400A can be minimized.

In another example embodiment, the mobility reference signals are transmitted in resource elements of the resource blocks in the subset, each resource element corresponding to a spectrum allocated for a subcarrier and an Orthogonal Frequency-Division Multiplexing, OFDM, symbol. In further example embodiments, said allocation of the subset may be configured by the network node 500 itself or it may be retrieved from a central node 504 in the wireless network.

In further example embodiments, the mobility reference signals may be the above-mentioned Cell-specific Reference Signals, CRSs, which are useful for measurements of at least one of Reference Signal Received Power, RSRP, and Reference Signal Received Quality, RSRQ.

A more detailed example of how the above-described procedure in the network node 500 may be carried out in practice by using some of the above embodiments, will now be described with reference to the flow chart in FIG. 7 using the same notations and terms as above. A first action 700 illustrates that the network node 500 obtains an allocation of a subset of resource blocks 400A to be used for mobility reference signals, as described for action 600 above. It was also mentioned above that the allocation may be determined by the network node 500 itself or obtained from the central node 504. In a next action 702, the network node 500 sets a value of the power increase Pb for P1 to achieve a certain wanted mobility coverage. The network node 500 then calculates the power decrease Pd for P2 based on Pb, the total number N of resource blocks in the entire set 400 and the number $N\_m$ of resource blocks in the subset 400A, in another action 704. In this action, the above-described formula (1) may be used although action 704 is not limited thereto.

The succeeding actions are performed in a parallel manner for the resource blocks in subset 400A and for the remaining, i.e. "other", resource blocks in the entire set 400 which other resource blocks are thus not included in the subset 400A. An action 706 illustrates that the network node 500 derives the first transmit power P1 from Pb, basically by applying the power increase Pb to the pre-defined maximum average transmit power Pavg per resource block. Another action 708, which may be executed basically at the same time as action 706, illustrates that the network node 500 derives the second transmit power P2 from Pd, basically by applying the power decrease Pd to the pre-defined maximum average transmit power Pavg.

In actions 706 and 708, applying the parameters Pb and Pd, respectively, may be performed by means of mathematical multiplication and division operations if the parameters are linearly represented, or addition and subtraction operations if the parameters are logarithmically represented. To use such mathematical operations is well-known as such in this field. The embodiments described herein are generally not limited to any particular operations for deriving P1 and P2 from Pb and Pd, respectively.

Finally, the network node 500 transmits the subset of resource blocks 400A using transmit power P1, in an action 710, and also transmits the other resource blocks in the entire set 400 not in the subset 400A using transmit power P2, in an action 712.

Figure 8:
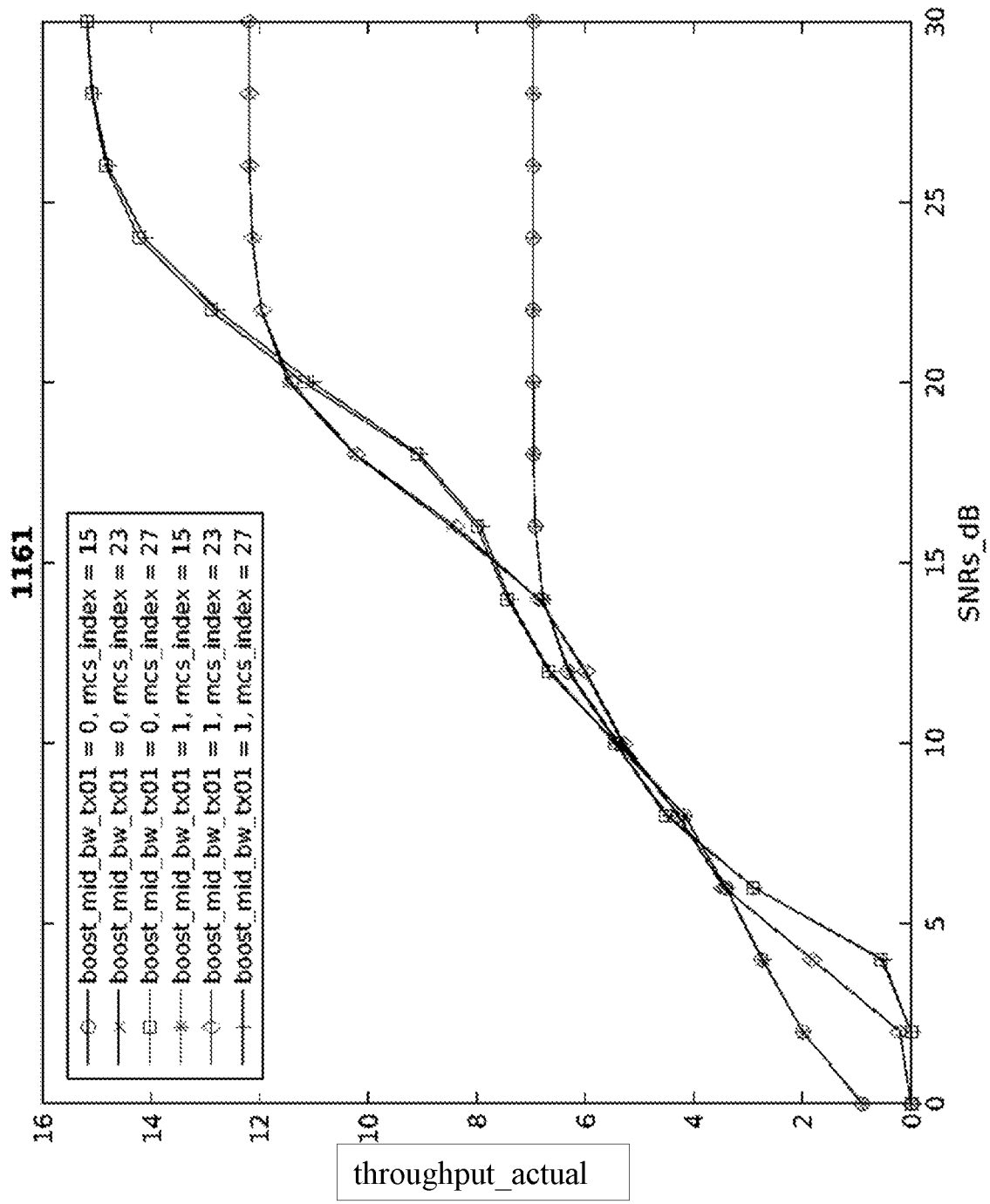
FIG. 8 is a diagram illustrating how link performance can be improved when the solution is used, according to further possible embodiments.

Some examples of how link performance can be maintained when the solution is used, are illustrated in FIG. 8 which is a diagram presenting simulation performance results with and without using the solution described herein. There are three indices for different Multiplexing and Coding Schemes, MCSs, providing different user data throughput rates. A performance pair with and without using the solution described herein is presented. The curves in this figure do not show performance in terms of range of mobility measurements, but rather performance in terms of user data throughput. Thus, it is shown that the solution described herein does not degrade data throughput performance. Since the MCS pairs overlap it can be said that this performance is unchanged by the solution. In other words, the effect of the increased power in the 6 central RBs does not notably affect the performance.

Figure 9:
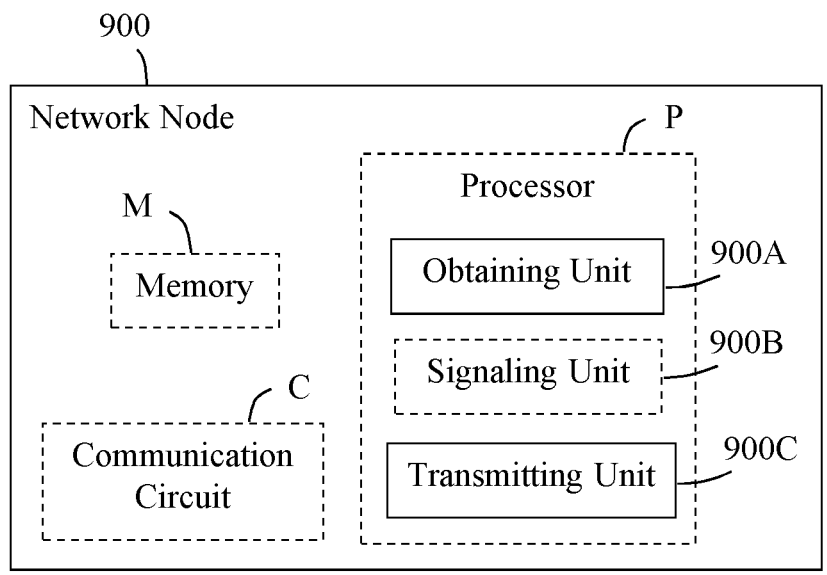
FIG. 9 is a block diagram illustrating how a network node may be configured, according to further possible embodiments.

The block diagram in FIG. 9 illustrates a detailed but non-limiting example of how a network node 900 may be structured to bring about the above-described solution and embodiments thereof. The network node 900 may be configured to operate according to any of the examples and embodiments of employing the solution as described above, where appropriate, and as follows. The network node 900 is shown to comprise a processor P and a memory M, said memory comprising instructions executable by said processor P whereby the network node 900 is operable as described herein. The network node 900 also comprises a communication circuit C with suitable equipment for receiving and transmitting signals in the manner described herein.

The communication circuit C is configured for communication with wireless devices and other network nodes using suitable protocols depending on the implementation. This communication may be performed in a conventional manner over a communication network employing radio links for wireless communication, which is not necessary to describe here as such in any detail. The solution and embodiments herein are thus not limited to using any specific types of networks, technology or protocols for radio communication.

Figure 6:
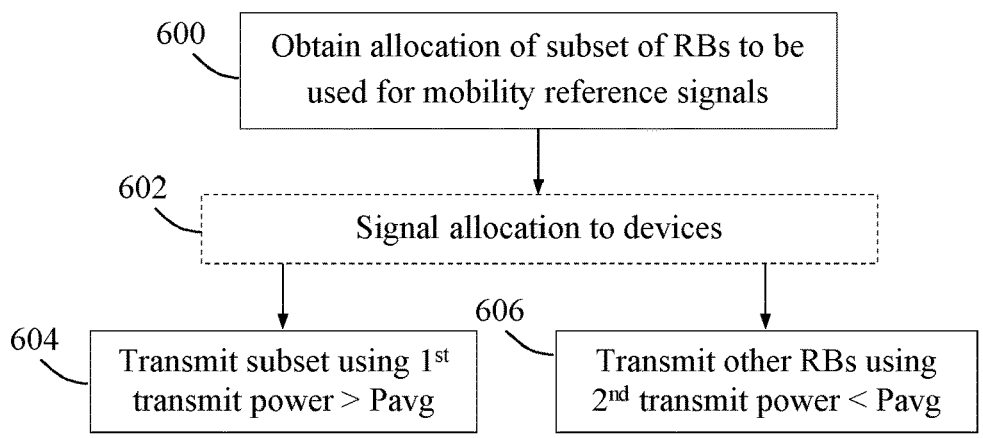
FIG. 6 is a flow chart illustrating a procedure in a network node, according to further possible embodiments.
Figure 7:
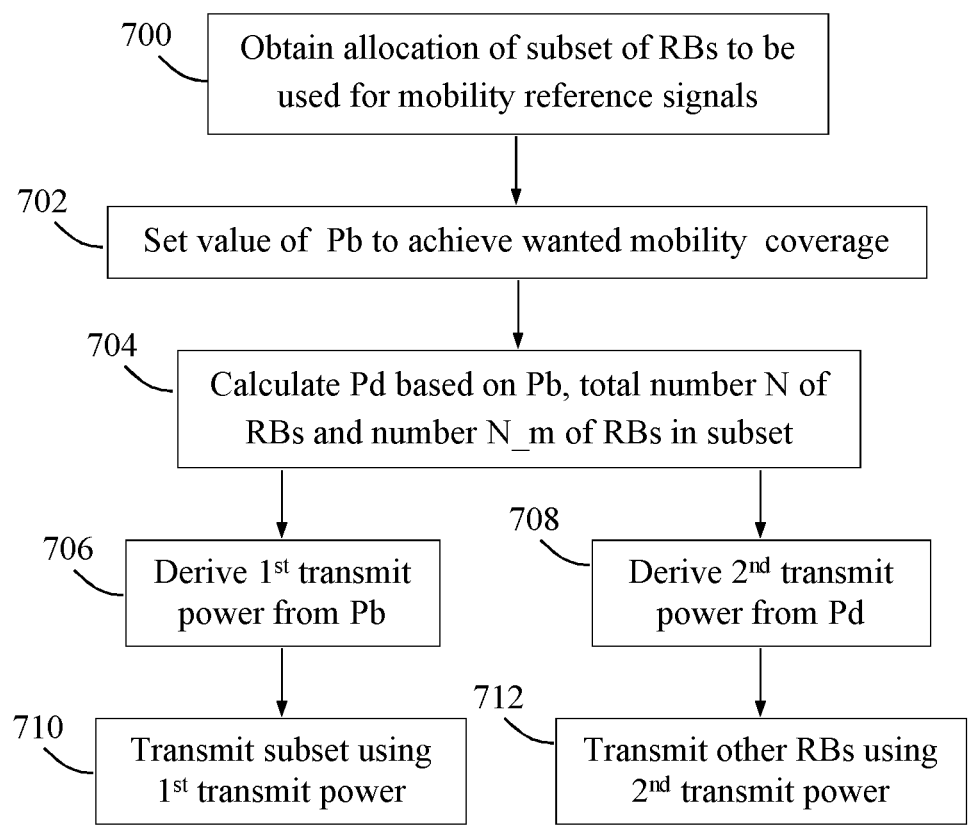
FIG. 7 is another flow chart illustrating a more detailed example procedure in a network node, according to further possible embodiments.

The network node 900 is configured to be operable in a wireless network and comprises means configured or arranged to perform at least some of the actions 600-606 and 700-712 in FIGS. 6 and 7, respectively. The network node 900 is arranged to enable mobility measurements performed by wireless devices, not shown, wherein a set of resource blocks are distributed in frequency domain across an available frequency bandwidth, and wherein a pre-defined maximum average transmit power Pavg per resource block is available for transmission by the network node 900.

The network node 900 is configured to obtain an allocation of a subset of resource blocks in the set of resource blocks, to be used for the mobility reference signals intended for mobility measurements. This operation may be performed by an obtaining unit 900A in the network node 900, e.g. in the manner described for action 600 above.

The network node 900 may also be configured to signal the allocation of the subset to the wireless devices, e.g. in dedicated messages or in a broadcast message. This operation may be performed by a signalling unit 900B in the network node 900, e.g. as described for action 602 above.

The network node 900 is configured to transmit the subset of resource blocks using a first transmit power P1 per resource block which is higher than the pre-defined maximum average transmit power per resource block. This operation may be performed by a transmitting unit 900C in the network node 900, e.g. as described above for action 604.

The network node 900 is also configured to transmit other resource blocks in the set not included in the subset using a second transmit power P2 per resource block which is lower than the pre-defined maximum average transmit power Pavg per resource block so that the total transmit power used for transmitting the set of resource blocks does not exceed a total available maximum transmit power. This operation may be performed by the transmitting unit 900C, e.g. as described above for action 606.

It should be noted that FIG. 9 illustrates various functional units in the network node 900, and the skilled person is able to implement these functional units in practice using suitable software and hardware. Thus, the solution is generally not limited to the shown structures of the network node 900, and the functional units 900A-C therein may be configured to operate according to any of the features and embodiments described in this disclosure, where appropriate.

The functional units 900A-C described above can be implemented in the network node 900 by means of suitable hardware and program modules of a computer program comprising code means which, when run by the processor P causes the network node 900 to perform at least some of the above-described actions and procedures.

Figure 9A:
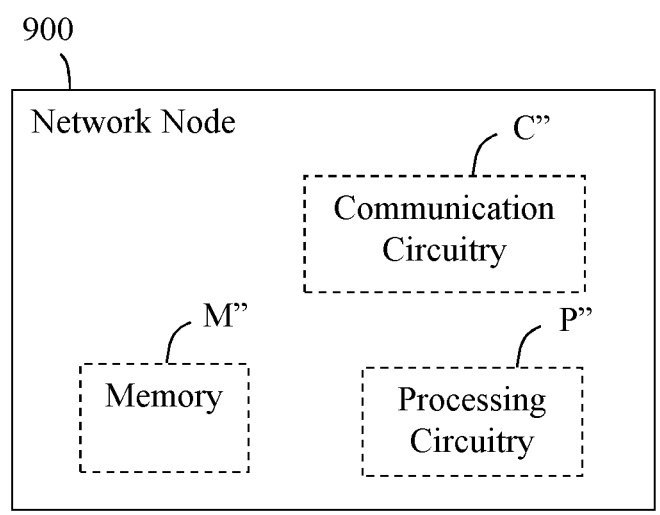
FIG. 9A is a block diagram illustrating another example of how a network node may be configured, according to further possible embodiments.

FIG. 9A illustrates another possible alternative of how the network node 900 may be configured with memory M", communication circuitry C" and processing circuitry P". The memory M" comprises instructions executable by said processing circuitry P" whereby the network node 900 is operative as described herein. The communication circuitry C" represents suitable equipment for receiving and sending information in the manner described herein and using a suitable protocol for the described communication depending on the implementation. The solution and embodiments herein are thus not limited to using any specific types of networks, technology or protocols for communication.

In either FIG. 9 or FIG. 9A, the processor P and processing circuitry P", respectively, may comprise a single Central Processing Unit (CPU), or could comprise two or more processing units such as CPUs. For example, the processor P and/or processing circuitry P" may include a general purpose microprocessor, an instruction set processor and/or related chip sets and/or a special purpose microprocessor such as an Application Specific Integrated Circuit (ASIC). The processor P and/or processing circuitry P" may also comprise a storage for caching purposes.

Each computer program may be carried by a computer program product in the network node 900 in the form of a memory having a computer readable medium and being connected to the processor P and/or processing circuitry P''. The computer program product or memory in the network node 900 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the network node 900.

The solution described herein may be implemented in the network node 900 by means of a computer program product comprising a computer program with computer readable instructions which, when executed on the network node 900, cause the network node 900 to carry out the actions according to any of the above embodiments, where appropriate.

While the solution has been described with reference to specific exemplifying embodiments, the description is generally only intended to illustrate the inventive concept and should not be taken as limiting the scope of the solution. For example, the terms "network node", "wireless device", "resource block", "reference signal", "transmit power", "normalized power" and "central node" have been used throughout this disclosure, although any other corresponding entities, functions, and/or parameters could also be used having the features and characteristics described herein. The solution is defined by the appended claims.

The invention claimed is:

1. A method performed by a network node of a wireless network, for enabling mobility measurements performed by wireless devices, a set of resource blocks being distributed in a frequency domain across an available frequency bandwidth, and a pre-defined maximum average transmit power (Pavg) per resource block being available for transmission by the network node, the method comprising:
obtaining an allocation of a subset of resource blocks in the set of resource blocks, to be used for mobility reference signals intended for mobility measurements;
transmitting the subset of resource blocks using a first transmit power (P1) per resource block which is higher than the pre-defined maximum average transmit power (Pavg) per resource block; and
transmitting other resource blocks in the set not included in the subset using a second transmit power (P2) per resource block which is lower than the pre-defined maximum average transmit power (Pavg) per resource block so that the total transmit power used for transmitting the set of resource blocks does not exceed a total available maximum transmit power, the first transmit power (P1) per resource block corresponding to a power increase (Pb) from a normalized power of 1 representing the pre-defined maximum average transmit power (Pavg) per resource block, the second transmit power (P2) per resource block corresponding to a power decrease (Pd) from the normalized power, the power increase (Pb) being set to a wanted value, the power decrease (Pd) being determined based at least on the power increase (Pb), a total number (N) of resource blocks in the set, and a number (N_m) of resource blocks in the subset.

2. The method according to claim 1, wherein the allocation of the subset is signalled to the wireless devices in one of dedicated messages and in a broadcast message.

3. The method according to claim 1, wherein Pd is determined as:

$$Pd = 1 - N\_m \cdot Pb/(N - N\_m).$$

4. The method according to claim 3, wherein the power increase Pb is set depending on the number of transmit antennas configured for the network node.

5. The A method according to claim 4, wherein the power increase Pb is set for one of one and two antennas via which the mobility reference signals are transmitted.

6. The method according to claim 1, wherein the first transmit power (P1) per resource block is applied to extend a coverage area of the network node to increase mobility coverage in the wireless network.

7. The method according to claim 1, wherein the network node is upgraded by increasing the number of transmit antennas, and the first transmit power (P1) per resource block is applied to maintain a coverage area of the network node achieved before increasing the number of transmit antennas.

8. The method according to claim 1, wherein the mobility reference signals are transmitted in resource elements of the resource blocks in the subset, each resource element corresponding to a spectrum allocated for a subcarrier and an Orthogonal Frequency-Division Multiplexing, OFDM, symbol.

9. The method according to claim 1, wherein the allocation of the subset is one of configured by the network node and retrieved from a central node in the wireless network.

10. The method according to claim 1, wherein the mobility reference signals are Cell-specific Reference Signals (CRS) for measurements of at least one of a Reference Signal Received Power (RSRP) and a Reference Signal Received Quality (RSRQ).

11. A network node arranged to enable mobility measurements performed by wireless devices, a set of resource blocks being distributed in frequency domain across an available frequency bandwidth, and a pre-defined maximum average transmit power (Pavg) per resource block being available for transmission by the network node, the network node being configured to:
obtain an allocation of a subset of resource blocks in the set of resource blocks, to be used for mobility reference signals intended for mobility measurements;
transmit the subset of resource blocks using a first transmit power (P1) per resource block which is higher than the pre-defined maximum average transmit power (Pavg) per resource block; and
transmit other resource blocks in the set not included in the subset using a second transmit power (P2) per resource block which is lower than the pre-defined maximum average transmit power (Pavg) per resource block so that the total transmit power used for transmitting the set of resource blocks does not exceed a total available maximum transmit power, the first transmit power (P1) per resource block corresponding to a power increase (Pb) from a normalized power of 1 representing the pre-defined maximum average transmit power (Pavg) per resource block, the second transmit power (P2) per resource block corresponding to a power decrease (Pd) from the normalized power;
set the power increase (Pb) to a wanted value; and
determine the power decrease (Pd) based at least on the power increase (Pb), a total number (N) of resource blocks in the set, and a number (N_m) of resource blocks in the subset.

12. The network node according to claim 11, wherein the network node is configured to signal the allocation of the subset to the wireless devices in one of dedicated messages and in a broadcast message.

13. The network node according to claim 11, wherein is determined as:

$$Pd=1-N\_m*Pb/(N-N\_m).$$

14. The network node according to claim 13, wherein the network node is configured to set the power increase Pb depending on the number of transmit antennas configured for the network node.

15. The network node according to claim 14, wherein the network node is configured to set the power increase Pb for one of one and two antennas via which the mobility reference signals are transmitted.

16. The network node according to claim 11, wherein the network node is configured to apply the first transmit power (P1) per resource block to extend a coverage area of the network node to increase mobility coverage in the wireless network.

17. The network node according to claim 11, wherein the network node is upgraded by increasing the number of transmit antennas, and the network node is configured to apply the first transmit power (P1) per resource block to maintain a coverage area of the network node achieved before increasing the number of transmit antennas.

18. The network node according to claim 11, wherein the network node is configured to transmit the mobility reference signals in resource elements of the resource blocks in the subset, each resource element corresponding to a spectrum allocated for a subcarrier and an Orthogonal Frequency-Division Multiplexing, OFDM, symbol.

19. The network node according to claim 11, wherein the network node is configured to one of configure the allocation of the subset and to retrieve the allocation of the subset from a central node in the wireless network.

20. The method according to claim 11, wherein the mobility reference signals are Cell-specific Reference Signals (CRS) for measurements of at least one of a Reference Signal Received Power (RSRP) and a Reference Signal Received Quality (RSRQ).

* * * * *